(12) United States Patent
Peters

(10) Patent No.: US 6,968,624 B1
(45) Date of Patent: Nov. 29, 2005

(54) CARROT SCOOP

(76) Inventor: Nancylou E. Peters, 5399 Bill Allen Hill Rd., Wellsville, NY (US) 14895

( * ) Notice: Subject to any disclaimer, the term of this patent is extended or adjusted under 35 U.S.C. 154(b) by 96 days.

(21) Appl. No.: 10/803,312

(22) Filed: Mar. 17, 2004

(51) Int. Cl.[7] .............................................. B26B 3/00
(52) U.S. Cl. ........................ 30/281; 30/317; 30/113.1
(58) Field of Search ......................... 30/113.1, 279.6, 30/280, 281, 314, 317

(56) References Cited

U.S. PATENT DOCUMENTS

| 129,966 | A |   | 7/1872  | Kimber |         |
|---------|---|---|---------|--------|---------|
| 339,542 | A |   | 4/1886  | Gates  |         |
| 414,856 | A |   | 11/1889 | Brock  |         |
| 712,792 | A |   | 11/1902 | Heimerdiner |    |
| 790,760 | A | * | 5/1905  | Stuart | 172/376 |
| 1,631,941 | A | * | 6/1927 | Straits | 30/280 |
| 3,861,087 | A | * | 1/1975 | Martin | 451/557 |
| 4,077,123 | A | * | 3/1978 | Popeil et al. | 30/286 |
| 4,345,516 | A | * | 8/1982 | Sinclair | 99/426 |
| 4,383,367 | A | * | 5/1983 | Mielnicki | 30/114 |
| 4,464,838 | A | * | 8/1984 | Girrbach et al. | 30/149 |
| 4,481,689 | A | * | 11/1984 | Westmoreland | 15/236.01 |
| 4,763,414 | A | * | 8/1988 | McNeill, II | 30/113.1 |
| 5,257,457 | A | * | 11/1993 | Cotter | 30/121 |
| 5,920,991 | A | * | 7/1999 | Tracy | 30/280 |
| 5,937,524 | A | * | 8/1999 | Hornsby | 30/113.1 |
| 6,722,042 | B1 | * | 4/2004 | Naville et al. | 30/280 |

* cited by examiner

*Primary Examiner*—Hwei-Siu Payer
(74) *Attorney, Agent, or Firm*—Law Office of Vincent G Lotempio; Vincent G. Lotempio

(57) ABSTRACT

A device for carving into a carrot comprising a handle having a first end and a second end with at least one blade extending from the first end of the handle. The blade is disposed at a right angle to the handle. The blade has at least one sharp cutting edge operatively arranged to carve into the carrot. A ring can be affixed to the second end of the handle. The handle includes a thumb grip proximate the blade.

7 Claims, 2 Drawing Sheets

CARROT SCOOP

FIELD OF THE INVENTION

The present invention relates to a device used to hollow out or scoop out the center of a halved carrot.

BACKGROUND OF THE INVENTION

The present invention relates to a device used to hollow out or scoop out the center of a half carrot, either raw or partially cooked. It also allows for the filling of mixed ingredients to form of gourmet dish, a snack dish, etc. Kitchen devices have been around for decades, comprise a handle and blade, or other cutting edge, used to peel or hollow out vegetables or fruits. Kitchen devices maintain their popularity for many reasons, including their convenience, portability, and ability to prepare foods in a unique way. However, most kitchen appliances are geared toward specific functions and uses.

The need to prepare food products in a variety of aesthetically pleasing ways has become more and more prevalent in today's society. The ability to create a unique food product presents several problems. One problem encountered in the use of kitchen devices, is the ability to create certain shapes or indentations in the food product. Food preparation prior to consumption has a variety requirements (to peel clean, hollow out in dispose of excess vegetable matter, for example). To prepare a vegetable, or other food item, a person has to use a vegetable parer, slicer or corer. However, none of these kitchen utensils are designed to hollow out or scoop out the center of a half carrot, either raw or partially cooked.

Many prior attempts have been made to alleviate the problems associated with typical kitchen devices designed to make specialty food products. But no kitchen devices are designed to scoop out the center of the carrot, while allowing the excess vegetable material to escape through the center of the blade.

For example, one typical kitchen device is disclosed in U.S. Pat. No. 129,966 (Kimber) discloses an apparatus that is designed to act as a knife for coring apples, paring fruit and vegetables, removing the eyes from potatoes and consists of a knife blade and an adjustable gage. However, this complicated and costly.

U.S. Pat. No. 414,856 (Brock) discloses a paring device with a pointed like scoop type blade of various shapes, with sharpened surfaces. This pointed like scoop is described as an oblique end of the tube one of which is used as a corer of apples. This invention suffers from the fact that the longitudinal opening is limited in size and its use is limited as a paring device used to only peel the skin of a vegetable.

Another cutting instrument is disclosed by U.S. Pat. No. 712,792 (Heimerdinger). This is a knife like device with the blade having oppositely disposed cutting edges. This instrument has a protective shield over the cutting edge to allow for cutting in a pulling or pushing fashion. This device has, however, a limited amount of cutting surface area as the blades are situated to scrape along the surface of the subject region and are not situated to hollow out an area. Because of its complexity, this device is costly to produce.

U.S. Pat. No. 339,542 (Gates) teaches a multifunctional tool which contains a blade for removing the core from an apple with a curved end. This invention contains a coring-ring that includes cutting edges upon one or both sides of the ring. This device presents a problem in that the blade is positioned at the end of the handle at an angle that is not conducive for hallowing out a carrot.

Thus it is readily apparent that there is a longfelt need for a vegetable-scooping device used to hollow out or scoop out the center of a half carrot, either raw or partially cooked.

SUMMARY OF THE INVENTION

The present invention comprises a device for carving into a carrot comprising a handle having a first end and a second end with at least one blade extending from the first end of the handle. The blade is disposed at a right angle to the handle. The blade has at least one sharp cutting edge operatively arranged to carve into the carrot. A ring can be affixed to the second end of the handle. The handle includes a thumb grip proximate the blade.

It is a general object of the present invention to provide a device for carving into a carrot that can generate a longitudinal groove into the body of a whole or halved carrot.

Another object of the present invention is to provide a device for carving into a carrot that has a blade with a blunt edge and a sharp cutting edge.

Yet another object of the present invention is to provide a vegetable scooping device with a blade having an aperture arranged to allow the discarded vegetable matter to escape.

Still another object of the present invention is to provide a vegetable scooping device that has a handle that is ergonomically shaped.

A further object of the present invention is to provide a vegetable scooping device that has a blade disposed at a 90 degree angle relative to the handle.

These and other objects, features, and advantages of the present invention will become apparent upon a reading of the detailed description and claims in view of the several drawing figures.

DETAILED DESCRIPTION OF THE PREFERRED EMBODIMENT

Figure 1:
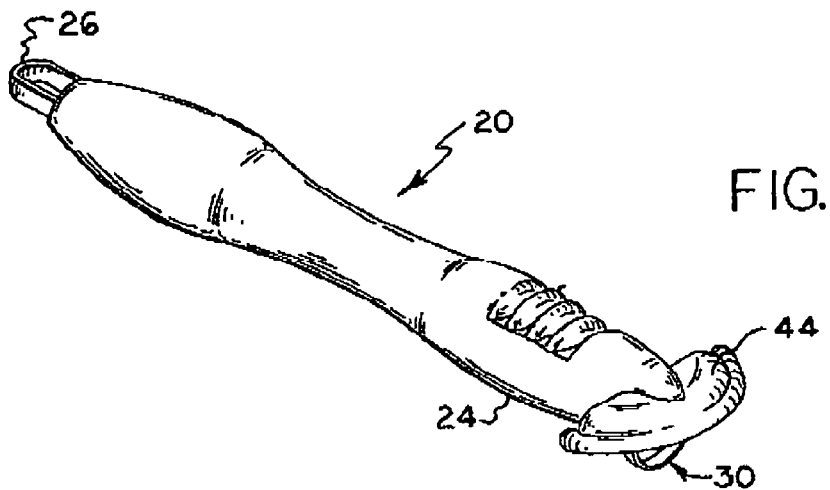
FIG. 1 is a perspective view of a preferred embodiment of the present invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Adverting now to the drawings, FIG. 1 is a perspective view showing scoop 20, which, in a preferred embodiment, comprises blade 30 mounted on handle 24. For a variety of reasons, foods such as vegetables are prepared in a variety of ways. Modern chefs prepare foods that are visually pleasing to eye as well as tasty. The present invention is a device for carving a carrot so that it can accept a food product in its center. The device allows a chef to prepare a carrot dish in a unique manner and provides a convenient carrot holder for a variety of different food fillings.

Figure 2:
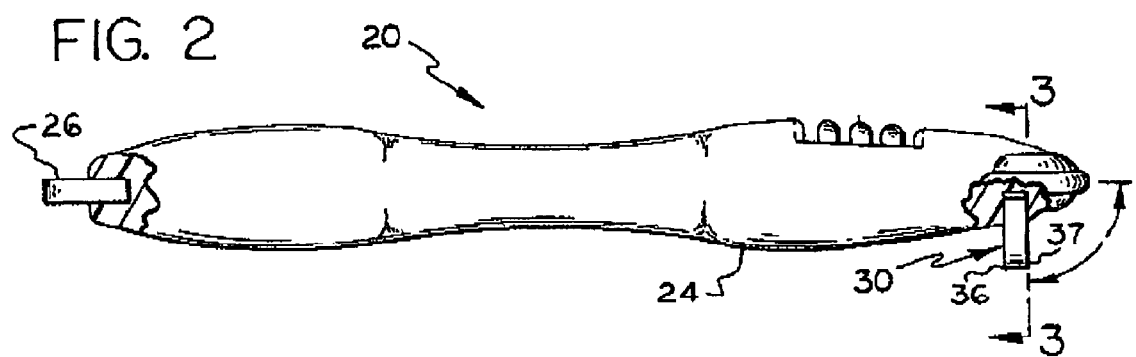
FIG. 2 is a side partial cross-sectional view of a preferred embodiment of the present invention.

FIG. 2 is a side partial cross-sectional view of a preferred embodiment of the present invention. This embodiment comprises a blade 30 which molded into the first end of handle 24 as depicted in FIG. 2. The blade extends downwardly from the first end of handle 24 at an angle of 90°. The blade is inserted into the first end of the handle which is molded around the blade. The handle is also configured with ring 26 which is molded into the second end of the handle. The ring extends outwardly from the handle at 180° from vertical. The ring of the instant invention is configured to accept a string or a hook so that the device can be suspended by a hook or a peg when stored between uses. Ring 26 can comprise any means well known in the art to hold scoop 20 to a peg, such as a hook or an aperture located at the second end of the handle. It should be understood that each of the embodiments of the present invention can be made with or without ring 26. In a preferred embodiment, the handle is made of plastic, although any other material that will provide support for blade, or the like can also be used, such as metal, glass, wood, or rubber.

Figure 3:
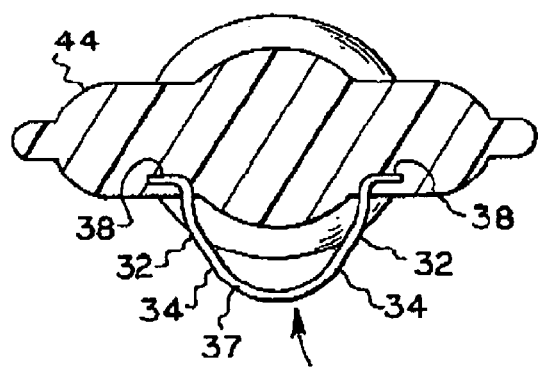
FIG. 3 is a cross-sectional view of the invention taken generally at plane 3—3 of FIG. 2.

FIG. 3 is a cross-sectional view of the invention taken generally at plane 3—3 of FIG. 2 illustrating the general U-shape of the blade. The blade is comprised of two straight ends which support the blade at blade end 38 and are inserted into the body of handle 24. The blade ends are L-shaped and are molded into head 44 of handle 24. The blade ends extend deep enough into the handle head so that it can withstand the significant stress it entertains when inserted to the body of a carrot and pulled across the surface. The arcuate blade extends outwardly in general a semi-circular shape. However the blade straightens between point 32 and point 34. The blade is thus configured in a "horseshoe" shape to enable it to create a carrot with the natural shape of a stalk of celery. When the blade is pulled over the top of a halved carrot the trench that is made mimics the trench in the center of a stalk of celery. FIG. 3 shows the base of the blade secured to the handle. Head 44 is configured to perpendicularly extend outwardly from the body of the handle and to accept and support the blade. It should be appreciated by those of ordinary skill in the art that head 44 of handle 24 may be constructed with either a closed or an open end to effectively hold the blade.

In the preferred embodiment, scoop 20 is configured with a metal ⅜" oval long angled steel blade, from tip to collar is measured ⅛" wide. A blade that is configured as such typically scoops a ⅝" wide path on the flat surface of the carrot, at a depth of approximately ⅜". The dimensions provided above are for reference purposes only. It should be understood other combinations of dimensions are also possible.

Figure 4:
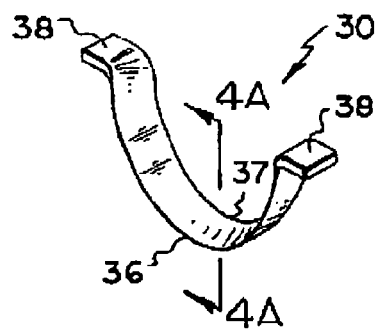
FIG. 4 is a perspective view of the blade of the invention.
Figure 4A:
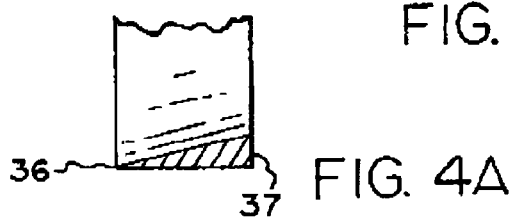
FIG. 4A is a side view of the blade taken generally along line 4A—4A of FIG. 4.

FIG. 4 is a perspective view of blade 30. FIG. 4 further illustrates the L-shaped blade ends 38. FIG. 4A is a side view of blade 30 taken generally along line 4A—4A of FIG. 4 illustrating sharp edge 36 and blunt edge 37.

Figure 5:
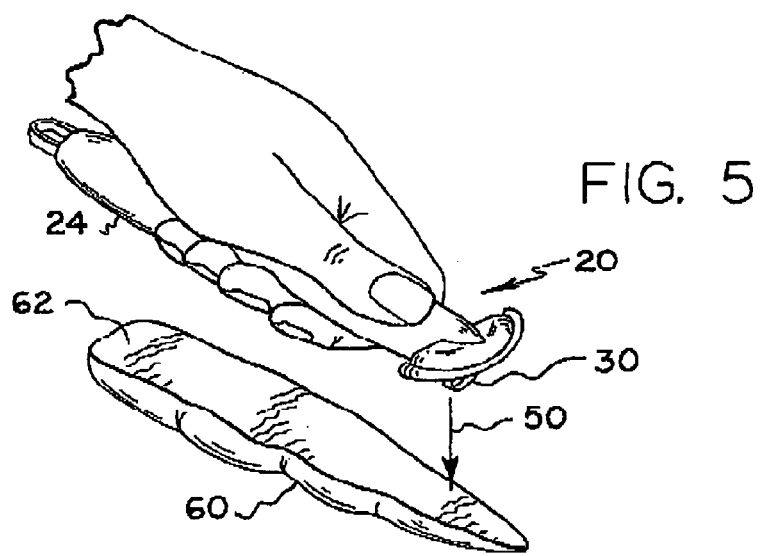
FIG. 5 is a perspective view of a preferred embodiment of the present invention showing an application of the invention with a carrot.
Figure 6:
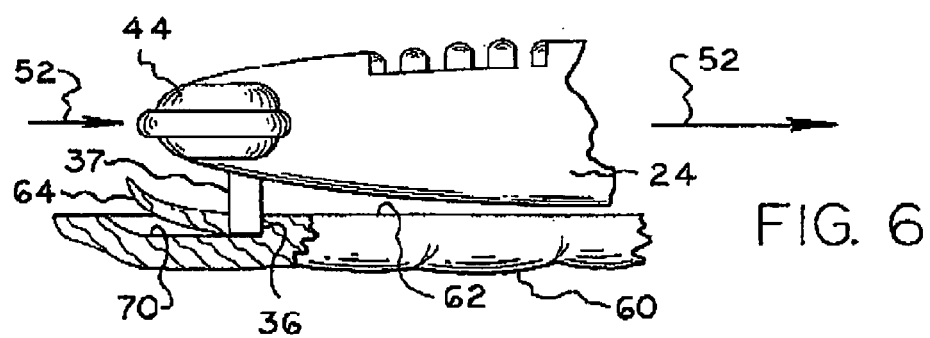
FIG. 6 is a side view of the scoop device cutting into to a side cross-sectional view of a carrot.

FIG. 5 is a perspective view of a preferred embodiment of the present invention showing an application of the invention with carrot 60. In a preferred method for preparing a carrot, the instrument is held as shown in FIG. 5, with carrot 60 positioned below the blade of the instrument. The instrument is pressed downward in the direction of arrow 50. Carrot 60 is pre-prepared so that it is sliced longitudinally in half, presenting flat surface 62 to the blade of the instrument of the present invention. The instrument is pulled generally in the direction of arrow 52 in FIG. 6. Any motion of blade 30 about the carrot in the direction of arrow 52 is accomplished against the body of carrot 60 (shown in FIG. 6). The sharp edge 36 of blade 30 slices into carrot 60. By imparting the pulling motion to the implement small shavings 64 of vegetable matter are pulled through the loop of the blade. The shavings produced can be used as part of filing 72 (showing in FIG. 7B).

Figure 7A:
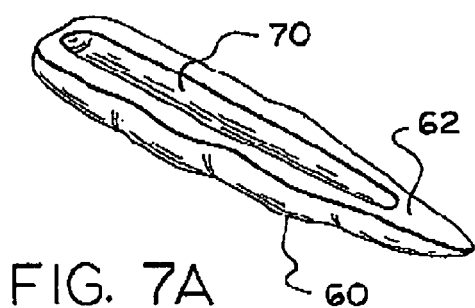
FIG. 7A is a perspective view of a carrot after the preferred embodiment of the invention has created a longitudinal groove across its surface.

FIG. 7A is a perspective view of carrot 60 after the preferred embodiment of the invention has created longitudinal groove 70 across flat surface 62. The carrot prepared in this manner is positioned to be garnished as would a stalk of celery for example. Longitudinal groove 70 is a crevice along the face of the carrot that can be filled with a variety of vegetable preparations. Although carrot 60 is shown in FIG. 7A as pre-prepared having a flat surface, it should be readily obvious to those of ordinary skill in the art that scoop device 20 could be used with uncut carrots or with carrots having a trimmed end, or different combinations of the same.

Figure 7B:
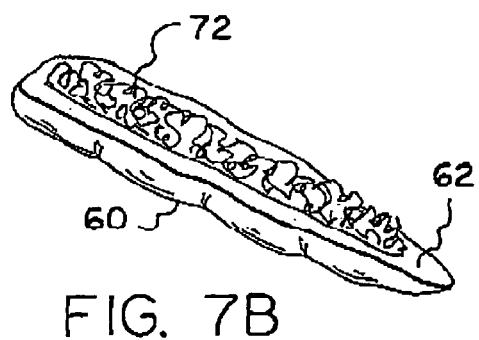
FIG. 7B is a perspective view of carrot half after the preferred embodiment of the invention has created a longitudinal groove and the groove has been filled with a food type matter.

FIG. 7B is a perspective view of carrot 60 after the preferred embodiment of the invention has created a longitudinal groove and the groove has been filled with filing 72. Filing 72 is a food matter such as a vegetable dip or garnish.

Thus, it is seen that the objects of the invention are efficiently obtained. It will be understood that the foregoing description is illustrative of the invention and should not be considered as limiting and that other embodiments of the invention are possible without departing from the invention's spirit and scope.

What is claimed is:

1. A device for carving into a carrot comprising:
   a handle having a first end and a second end;
   at least one blade extending from said first end of said handle disposed at a right angle to said handle, wherein said blade is U-shaped having at least one sharp cutting edge operatively arranged to carve into said carrot;
   a ring affixed to said second end of said handle;
   at least one groove operatively arranged as a thumb grip proximate said first end of said handle;
   a head that is configured to perpendicularly extend outwardly from said handle and said blade has L-shaped ends which are molded into said head.

2. The device for carving into a carrot recited in claim 1 wherein said handle has a tapered center portion.

3. The device for carving into a carrot recited in claim 2 wherein said handle has a head attachment and said blade is mounted to said head attachment.

4. A device for carving into a carrot comprising a handle having a first end and a second end, said handle having at least one U-shaped blade extending from said first end, wherein said blade is disposed at a right angle relative to said handle and said blade has at least one sharp cutting edge operatively arranged to carve into said carrot; a head that is configured to perpendicularly extend outwardly from said handle and said blade has L-shaped ends which are molded into said head.

5. The device for carving into a carrot recited in claim 4 having a ring affixed to said second end of said handle.

6. The device for carving into a carrot recited in claim 5 having at least one groove operatively arranged as a thumb grip proximate said first end of said handle.

7. The device for carving into a carrot recited in claim 6 wherein said handle includes a tapered center portion.

* * * * *